United States Patent
Goldstein et al.

(10) Patent No.: US 12,174,901 B2
(45) Date of Patent: Dec. 24, 2024

(54) METHODS AND SYSTEMS FOR SEARCHING UTILIZING ACOUSTICAL CONTEXT

(71) Applicant: The Diablo Canyon Collective LLC, Wilmington, DE (US)

(72) Inventors: Steven W. Goldstein, Delray Beach, FL (US); Jordan Cohen, Kure Beach, NC (US)

(73) Assignee: Apple Inc., Cupertino, CA (US)

( * ) Notice: Subject to any disclaimer, the term of this patent is extended or adjusted under 35 U.S.C. 154(b) by 517 days.

(21) Appl. No.: 16/563,537

(22) Filed: Sep. 6, 2019

(65) Prior Publication Data
US 2019/0391999 A1     Dec. 26, 2019

Related U.S. Application Data (63) Continuation of application No. 14/007,482, filed as application No. PCT/US2012/030862 on Mar. 28, 2012, now Pat. No. 10,409,860.
(Continued)

(51) Int. Cl.
*G06F 16/00*     (2019.01)
*G06F 16/635*    (2019.01)
(Continued)

(52) U.S. Cl.
CPC .......... *G06F 16/953* (2019.01); *G06F 16/635* (2019.01); *G06F 16/638* (2019.01);
(Continued)

(58) Field of Classification Search
None
See application file for complete search history.

(56) References Cited

U.S. PATENT DOCUMENTS 3,876,843 A    4/1975 Moen
4,054,749 A   10/1977 Suzuki et al.
(Continued)

FOREIGN PATENT DOCUMENTS

| EP | 1519625 A2 | 3/2005 |
| EP | 20100834620 | 12/2012 |
| WO | 2006037156 A1 | 4/2006 |

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.
(Continued)

*Primary Examiner* — Thu Nguyet T Le
(74) *Attorney, Agent, or Firm* — Aikin & Gallant, LLP (57) ABSTRACT

Systems, controllers and methods for contextual-based searching are provided. A system includes one or more devices configured to collect at least one audio stream and a contextual search system. The contextual search system includes a data analyzer and a search engine. The data analyzer is configured to receive the at least one audio stream from among the one or more devices and to determine contextual information from the received at least one audio stream. The search engine is configured to perform a search of at least one search term using the contextual information, to produce a search result.

20 Claims, 5 Drawing Sheets

Related U.S. Application Data (60) Provisional application No. 61/516,026, filed on Mar. 28, 2011.

(51) Int. Cl.

| | |
|---|---|
| *G06F 16/638* | (2019.01) |
| *G06F 16/68* | (2019.01) |
| *G06F 16/9032* | (2019.01) |
| *G06F 16/953* | (2019.01) |
| *G10L 25/54* | (2013.01) |
| *G10L 15/08* | (2006.01) |
| *G10L 17/00* | (2013.01) |
| *G10L 25/63* | (2013.01) |
| *G10L 25/78* | (2013.01) |

(52) U.S. Cl.
CPC .......... *G06F 16/68* (2019.01); *G06F 16/9032* (2019.01); *G10L 25/54* (2013.01); *G10L 2015/088* (2013.01); *G10L 17/00* (2013.01); *G10L 25/63* (2013.01); *G10L 25/78* (2013.01)

(56) References Cited

U.S. PATENT DOCUMENTS

| | | | |
|---|---|---|---|
| 4,088,849 A | 5/1978 | Usami et al. | |
| 4,947,440 A | 8/1990 | Bateman et al. | |
| 5,208,867 A | 5/1993 | Stites, III | |
| 5,267,321 A | 11/1993 | Langberg | |
| 5,524,056 A | 6/1996 | Killion et al. | |
| 5,903,868 A | 5/1999 | Yuen et al. | |
| 5,946,050 A * | 8/1999 | Wolff | H04N 21/4334 |
| | | | 348/E5.103 |
| 6,021,207 A | 2/2000 | Puthuff et al. | |
| 6,021,325 A | 2/2000 | Hall | |
| 6,163,338 A | 12/2000 | Johnson et al. | |
| 6,163,508 A | 12/2000 | Kim et al. | |
| 6,226,389 B1 | 5/2001 | Lemelson et al. | |
| 6,298,323 B1 | 10/2001 | Kaemmerer | |
| 6,359,993 B2 | 3/2002 | Brimhall | |
| 6,400,652 B1 | 6/2002 | Goldberg et al. | |
| 6,415,034 B1 | 7/2002 | Hietanen | |
| 6,567,524 B1 | 5/2003 | Svean et al. | |
| RE38,351 E | 12/2003 | Seberg et al. | |
| 6,661,901 B1 | 12/2003 | Svean et al. | |
| 6,728,385 B2 | 4/2004 | Kvaloy et al. | |
| 6,748,238 B1 | 6/2004 | Lau | |
| 6,754,359 B1 | 6/2004 | Svean et al. | |
| 6,804,638 B2 | 10/2004 | Fiedler | |
| 6,804,643 B1 | 10/2004 | Kiss | |
| 7,072,482 B2 | 7/2006 | Van Doorn et al. | |
| 7,107,109 B1 | 9/2006 | Nathan et al. | |
| 7,209,569 B2 | 4/2007 | Boesen | |
| 7,430,299 B2 | 9/2008 | Armstrong et al. | |
| 7,433,714 B2 | 10/2008 | Howard et al. | |
| 7,450,730 B2 | 11/2008 | Bertg et al. | |
| 7,477,756 B2 | 1/2009 | Wickstrom et al. | |
| 7,562,020 B2 | 7/2009 | Le et al. | |
| 7,756,281 B2 | 7/2010 | Goldstein et al. | |
| 7,756,285 B2 | 7/2010 | Sjursen et al. | |
| 7,778,434 B2 | 8/2010 | Juneau et al. | |
| 7,920,557 B2 | 4/2011 | Moote | |
| 8,014,553 B2 | 9/2011 | Radivojevic et al. | |
| 8,047,207 B2 | 11/2011 | Perez et al. | |
| 8,194,864 B2 | 6/2012 | Goldstein et al. | |
| 8,199,919 B2 | 6/2012 | Goldstein et al. | |
| 8,208,644 B2 | 6/2012 | Goldstein et al. | |
| 8,208,652 B2 | 6/2012 | Keady | |
| 8,221,861 B2 | 7/2012 | Keady | |
| 8,229,128 B2 | 7/2012 | Keady | |
| 8,251,925 B2 | 8/2012 | Keady et al. | |
| 8,312,960 B2 | 11/2012 | Keady | |
| 8,437,492 B2 | 5/2013 | Goldstein et al. | |
| 8,493,204 B2 | 7/2013 | Wong et al. | |
| 8,550,206 B2 | 10/2013 | Keady et al. | |
| 8,554,350 B2 | 10/2013 | Keady et al. | |
| 8,600,067 B2 | 12/2013 | Usher et al. | |
| 8,631,801 B2 | 1/2014 | Keady | |
| 8,657,064 B2 | 2/2014 | Staab et al. | |
| 8,678,011 B2 | 3/2014 | Goldstein et al. | |
| 8,718,313 B2 | 5/2014 | Keady | |
| 8,750,295 B2 | 6/2014 | Liron | |
| 8,848,939 B2 | 9/2014 | Keady et al. | |
| 8,917,880 B2 | 12/2014 | Goldstein et al. | |
| 8,992,710 B2 | 3/2015 | Keady | |
| 9,037,458 B2 | 5/2015 | Park et al. | |
| 9,113,267 B2 | 8/2015 | Usher et al. | |
| 9,123,323 B2 | 9/2015 | Keady | |
| 9,123,343 B2 | 9/2015 | Kurki-Suonio | |
| 9,135,797 B2 | 9/2015 | Couper et al. | |
| 9,138,353 B2 | 9/2015 | Keady | |
| 9,185,481 B2 | 11/2015 | Goldstein et al. | |
| 9,216,237 B2 | 12/2015 | Keady | |
| 9,539,147 B2 | 1/2017 | Keady et al. | |
| 9,757,069 B2 | 9/2017 | Keady et al. | |
| 9,781,530 B2 | 10/2017 | Usher et al. | |
| 9,843,854 B2 | 12/2017 | Keady | |
| 10,009,677 B2 | 6/2018 | Goldstein et al. | |
| 10,012,529 B2 | 7/2018 | Goldstein et al. | |
| 10,043,534 B2 | 8/2018 | Usher et al. | |
| 10,043,535 B2 | 8/2018 | Usher et al. | |
| 10,051,356 B2 | 8/2018 | Goldstein | |
| 10,143,592 B2 | 12/2018 | Goldstein | |
| 10,190,904 B2 | 1/2019 | Goldstein et al. | |
| 10,200,775 B2 | 2/2019 | Goldstein et al. | |
| 10,362,381 B2 | 7/2019 | Goldstein et al. | |
| 2001/0040590 A1* | 11/2001 | Abbott | G06Q 30/00 |
| | | | 715/700 |
| 2001/0046304 A1 | 11/2001 | Rast | |
| 2002/0087525 A1* | 7/2002 | Abbott | G06F 16/9535 |
| 2002/0106091 A1 | 8/2002 | Furst et al. | |
| 2002/0118798 A1 | 8/2002 | Langhart et al. | |
| 2003/0110034 A1* | 6/2003 | Runge | G10L 17/24 |
| | | | 704/E17.016 |
| 2003/0161097 A1 | 8/2003 | Le et al. | |
| 2003/0165246 A1 | 9/2003 | Kvaloy et al. | |
| 2004/0042103 A1 | 3/2004 | Mayer | |
| 2004/0109668 A1 | 6/2004 | Stuckman | |
| 2004/0125965 A1 | 7/2004 | Alberth, Jr. et al. | |
| 2004/0190737 A1 | 9/2004 | Kuhnel et al. | |
| 2004/0196992 A1 | 10/2004 | Ryan | |
| 2004/0203351 A1 | 10/2004 | Shearer et al. | |
| 2005/0078838 A1 | 4/2005 | Simon | |
| 2005/0123146 A1 | 6/2005 | Voix et al. | |
| 2005/0288057 A1 | 12/2005 | Lai et al. | |
| 2006/0028488 A1* | 2/2006 | Gabay | H04L 65/1101 |
| | | | 345/626 |
| 2006/0067551 A1 | 3/2006 | Cartwright et al. | |
| 2006/0083395 A1 | 4/2006 | Allen et al. | |
| 2006/0092043 A1 | 5/2006 | Lagassey | |
| 2006/0195322 A1 | 8/2006 | Broussard et al. | |
| 2006/0204014 A1 | 9/2006 | Senberg et al. | |
| 2007/0043563 A1 | 2/2007 | Comerford et al. | |
| 2007/0086600 A1 | 4/2007 | Boesen | |
| 2007/0189544 A1 | 8/2007 | Rosenberg | |
| 2007/0244866 A1* | 10/2007 | Mishkanian | G06F 16/951 |
| 2007/0255831 A1 | 11/2007 | Hayashi et al. | |
| 2007/0291953 A1 | 12/2007 | Ngia et al. | |
| 2008/0005067 A1 | 1/2008 | Dumais et al. | |
| 2008/0037801 A1 | 2/2008 | Alves et al. | |
| 2008/0165988 A1 | 7/2008 | Terlizzi et al. | |
| 2008/0270126 A1 | 10/2008 | Jung et al. | |
| 2009/0006345 A1 | 1/2009 | Platt et al. | |
| 2009/0010456 A1 | 1/2009 | Goldstein et al. | |
| 2009/0024234 A1 | 1/2009 | Archibald | |
| 2009/0071487 A1 | 3/2009 | Keady | |
| 2009/0077180 A1* | 3/2009 | Flowers | G06F 16/3329 |
| | | | 709/206 |
| 2009/0150156 A1 | 6/2009 | Kennewick et al. | |
| 2009/0327263 A1* | 12/2009 | Maghoul | G06F 16/3329 |
| | | | 707/999.005 |
| 2010/0061564 A1 | 3/2010 | Clemow et al. | |
| 2010/0199188 A1* | 8/2010 | Abu-Hakima | H04W 4/02 |
| | | | 709/224 |

(56) References Cited

U.S. PATENT DOCUMENTS

| | | |
|---|---|---|
| 2010/0241256 A1 | 9/2010 | Goldstein et al. |
| 2010/0296668 A1 | 11/2010 | Lee et al. |
| 2010/0302907 A1 | 12/2010 | Brumley |
| 2011/0043652 A1* | 2/2011 | King ............... G06F 40/194 707/706 |
| 2011/0096939 A1 | 4/2011 | Ichimura |
| 2011/0238191 A1 | 9/2011 | Kristjansson et al. |
| 2011/0257974 A1* | 10/2011 | Kristjansson ....... G10L 21/0208 455/456.1 |
| 2011/0264447 A1 | 10/2011 | Visser et al. |
| 2011/0293103 A1 | 12/2011 | Park et al. |
| 2011/0307253 A1* | 12/2011 | Lloyd .................. G10L 15/20 704/E21.002 |
| 2013/0006629 A1* | 1/2013 | Honda ................ G10L 15/187 704/E15.001 |
| 2013/0089769 A1 | 4/2013 | Proctor et al. |
| 2013/0098706 A1 | 4/2013 | Keady |
| 2013/0123919 A1 | 5/2013 | Goldstein et al. |
| 2013/0149192 A1 | 6/2013 | Keady |
| 2014/0003644 A1 | 1/2014 | Keady et al. |
| 2014/0026665 A1 | 1/2014 | Keady |
| 2014/0146989 A1 | 5/2014 | Goldstein |
| 2014/0155688 A1 | 6/2014 | Goldstein et al. |
| 2014/0372401 A1 | 12/2014 | Goldstein et al. |
| 2014/0373854 A1 | 12/2014 | Keady |
| 2015/0201270 A1 | 7/2015 | Keady |
| 2016/0015568 A1 | 1/2016 | Keady |
| 2016/0104452 A1 | 4/2016 | Guan et al. |
| 2016/0166203 A1 | 6/2016 | Goldstein |
| 2016/0192077 A1 | 6/2016 | Keady |
| 2016/0295311 A1 | 10/2016 | Keady et al. |
| 2016/0324478 A1 | 11/2016 | Goldstein |
| 2017/0112671 A1 | 4/2017 | Goldstein |
| 2017/0134865 A1 | 5/2017 | Goldstein et al. |
| 2017/0208027 A1 | 7/2017 | Goldstein |
| 2018/0054668 A1 | 2/2018 | Keady |
| 2018/0132048 A1 | 5/2018 | Usher et al. |
| 2018/0220239 A1 | 8/2018 | Keady et al. |
| 2018/0336912 A1 | 11/2018 | Usher et al. |
| 2018/0336914 A1 | 11/2018 | Usher et al. |
| 2019/0082272 A9 | 3/2019 | Goldstein et al. |
| 2019/0098391 A1 | 3/2019 | Goldstein |
| 2019/0142641 A1 | 5/2019 | Goldstein |
| 2019/0174219 A1 | 6/2019 | Goldstein et al. |
| 2021/0082404 A1* | 3/2021 | Sanders ................ G10L 15/26 |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

Mauro Dentino, John M. McCool, and Bernard Widrow, Adaptive Filtering in the Frequency Domain, Proceedings of the IEEE, vol. 66, No. 12, Dec. 1978.

* cited by examiner

METHODS AND SYSTEMS FOR SEARCHING UTILIZING ACOUSTICAL CONTEXT

CROSS-REFERENCE TO RELATED APPLICATIONS

This application is a continuation of and claims priority to U.S. patent application Ser. No. 14/007,482, filed Mar. 7, 2014, which is a National Phase of International Application No. PCT/US2012/030862, filed Mar. 28, 2012, which claims priority to U.S. Patent Application Ser. No. 61/516,026 filed Mar. 28, 2011, the disclosures of which are herein incorporated by reference in their entirety.

FIELD OF THE INVENTION

The present invention relates to search engines and, more particularly, to methods and systems for searching using acoustical context based on audio streams from one or more devices.

BACKGROUND OF THE INVENTION

Many devices can sample their environment for different information. In some cases, devices may locally process audio or multimedia information from their environment. For example, "smart" cell phones (e.g., Apple iPhone®, Android™-operating system-based phones) have significant local processing capabilities as well as audio and video acquisition devices.

SUMMARY OF THE INVENTION

The present invention is embodied in systems, controllers and methods for contextual-based searching. A system includes one or more devices configured to collect at least one audio stream and a contextual search system. The contextual search system includes a data analyzer and a search engine. The data analyzer is configured to receive the at least one audio stream from among the one or more devices and to determine contextual information from the received at least one audio stream. The search engine is configured to perform a search of at least one search term using the contextual information, to produce a search result.

According to an aspect of the present invention, one or more devices can provide signals to a contextual search system including a classifier and a search engine. The classifier (such as a speech recognizer) may provide contextual information which may be useful for performance of a search by the search engine. The signals may include audio information as well as other information (for example, location, time of day, environmental conditions, etc.). The audio information and other information may provide disambiguating information (i.e., contextual information) for search terms. For example, "turkey" may relate to a bird, a country, a personal assessment, a sandwich, etc. The contextual information about the intent of the search initiator, location, physical environment and/or other events may be used by the search engine, for example, to expand or narrow a search.

According to another aspect of the present invention, a device may collect speech signals, environmental sounds, location specific audio, and other geographical location data, and may pass some or all of this data to a contextual search system for action or analysis (such as for a "voice search").

BRIEF DESCRIPTION OF THE DRAWINGS

The invention may be understood from the following detailed description when read in connection with the accompanying drawing. It is emphasized that, according to common practice, various features/elements of the drawing may not be drawn to scale. On the contrary, the dimensions of the various features/elements may be arbitrarily expanded or reduced for clarity. Moreover, in the drawing, common numerical references are used to represent like features/elements. Included in the drawing are the following figures.

DETAILED DESCRIPTION OF THE INVENTION

Many devices may sample their environment for information. For example, cell phones may report their position, acceleration, audio environment, illumination level, status, may display contents and may provide other information. Additional sensors, in conjunction with a cell phone or other device, may provide access to audio or other biological, biometric, physiological, environmental signals created by a user, audio about the environment of the user, electrical signals from phones, radios, or other devices to which they are tuned, and alerts or notification of audio events which may be categorized from these signals. Each of these devices, in turn, may have access to large amounts of local and remote data storage, to one or more communications protocols, and to processes which may record, forward, analyze and/or inform the local user's cell phone and/or other devices about current situations or emerging conditions.

Aspects of the present invention relate to systems and methods for using acoustical context to perform a search. Data may be acquired from one or more devices which may acquire audio signals (also referred to herein as audio streams), as well as information from other sensors (such as a geographical location). The data may include the audio signals and/or acoustic information related to the audio signals. For example, the acoustic information may include features extracted from the corresponding audio signal (for example, by a statistical model such as a hidden Markov model (HMM)), key words detected in the audio signal and/or a transcript of the audio signal. According to an exemplary embodiment, one or more devices may be configured to capture a near field signal associated with the device and a far field signal associated with an ambient environment in proximity to the device, such that the acquired data may include the near field and far field signals.

The acquired data from the one or more devices may be analyzed in association with a search term, to determine contextual information associated with the search term. A search may be performed for the search term modified by the contextual information.

According to another aspect of the present invention, a device may collect and analyze information not only from its own immediate environment, but also from a pre-organized or ad-hoc network of devices, which have been linked together to form a distributed collecting pool of an information source. Audio (as well as other information) collected over the network may be selectively captured (for example, with beamforming or other transducer signal processing techniques) and analyzed (for example, for key words and/or events). The key words and/or events from across the network may be combined to create context for a search. For example, transducers from selected devices across the network may be used as a beamforming array. The devices may be selected autonomously or by the network.

According to another aspect of the present invention, data from one or more devices, combined with any search events, which have been processed either autonomously or responsive to an action (e.g., an indication received from a user via a keypad, a pen, a mouse, touch pad), can be recorded in an appropriate form for later analysis. The recording may be performed local to or remote from the device, and may be in any suitable form for analysis. For example, the recording may be in the form of an audio stream, a transcription, one or more key words, extracted features from the audio stream, sensed parameters or classification results, telephone call metadata or radio information, text from search events, or any combination thereof.

The recorded data may, optionally, be time marked and geographically coded, with other metadata (for example, environmental information such as temperature) and may be indexed or simply provided as a data resource at a later time. The identity of speakers (i.e. users' identities) associated with one or more devices may be determined by the network, as noted below, or may be assigned by the user at the time of initiation or review of the recorded information. The speaker identity may also be included in determining the context of a search.

According to an exemplary embodiment, a user of a device may hear a sound (such an a non-speech sound, a conversation, a particular speaker) and may indicate to the device to highlight the portion of the audio and/or a transcription of the audio. For example, if the device includes an earpiece, the user may provide voice activation for the highlighting, such as via a microphone in the earpiece. In this manner, the transcription of the audio may be visually highlighted and presented to the user, for their later review.

According to another aspect of the present invention, results of a context-sensitive search process may be provided not only to the local user but to some or all of devices on the network which initiates the search, or, in a hierarchically organized situation (e.g., a fire department, a police action) to a supervising or other supporting organization (for example, for crowd sourcing).

According to another aspect of the present invention, a system may provide a log of local events modulated by any legal restrictions associated with a geographic location (for example, a city or state), as well as any status of permissions collected from participants in events collected by the system. Thus, the logged information may comply with any legal restrictions regarding recording people without consent or other constraints as imposed by the laws of the locality. For example, in some circumstances it may be legal to record audio from a telephone discussion, but it may not be legal to capture a transcript of the discussion, or possibly just the topic of the discussion.

Aspects of the present invention include the use of information from devices and networks which sample or monitor the environment of one or more users. The information may be used to create a more effective search, to provide information delivery to the one or more users of these devices about their history and information relevant to the history but not contained in that history. The information may also be used to provide advertising or other opportunities either contemporaneously to historical events or at a later time.

Figure 1:
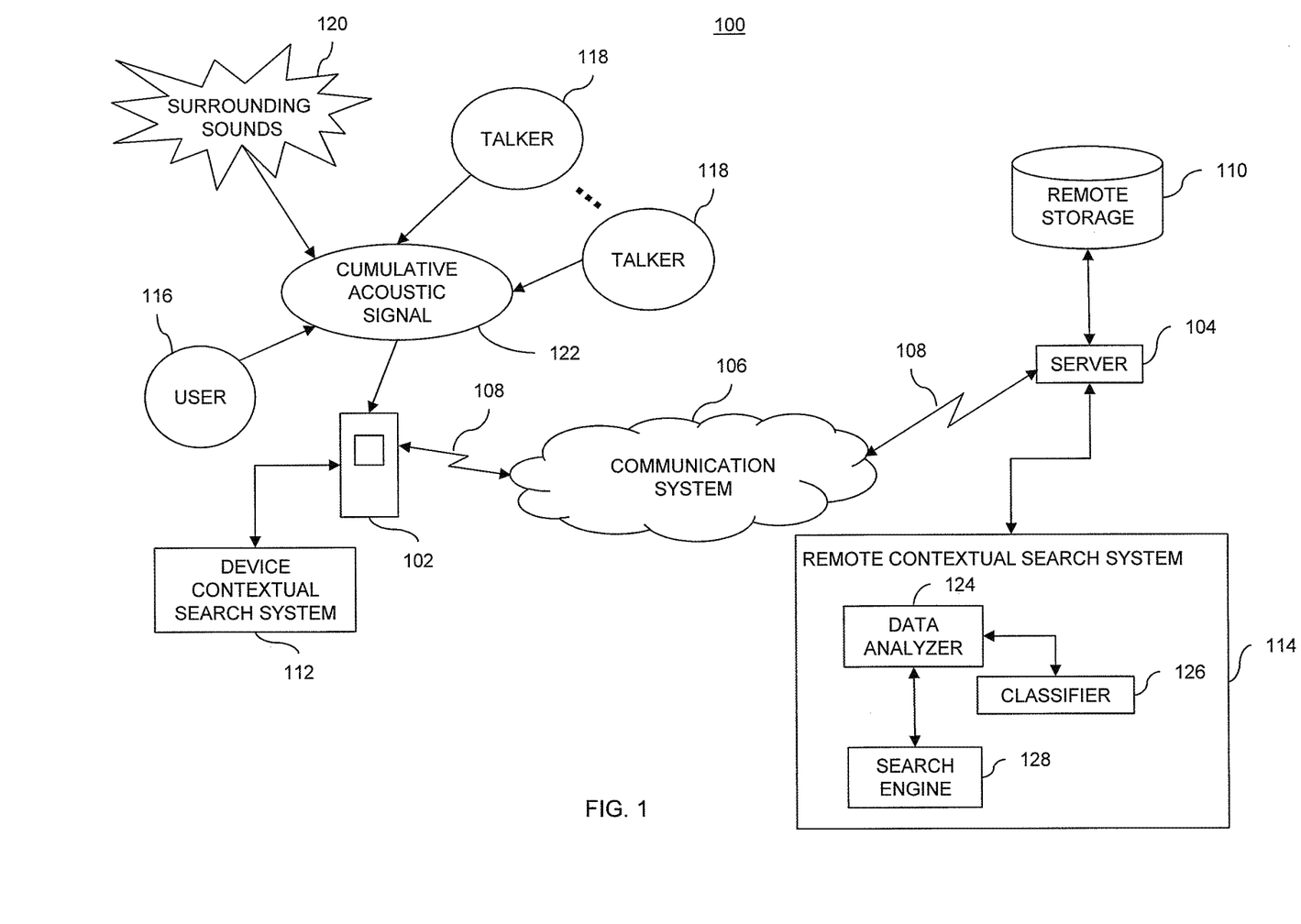
FIG. 1 is a functional block diagram of an exemplary system for contextual-based searching, according to an embodiment of the present invention.

Referring to FIG. 1, a functional block diagram of an exemplary system for contextual-based searching, designated generally as system 100, is shown. System 100 may include device 102 and server 104. Device 102 may be configured to communicate with server 104 via communication system 106, by communication link 108. Device 102 may include device contextual search system 112. Server 104 may be coupled to remote contextual search system 114. Server 104 may also be coupled to remote storage 110.

In FIG. 1, communication system 106 is illustrated as a wireless data network. According to another example, communication system 106 may include a cellular telephone system or a computer network such as the Internet. Although FIG. 1 shows that server 104 includes remote contextual search system 114, it is understood that communication system 106 may be directly coupled to remote contextual search system 114 and/or remote storage 110.

Device 102 may include any suitable device capable of capturing acoustic information. In an exemplary embodiment, device 102 may include a cell phone. According to another exemplary embodiment, device 102 may include an earpiece and an external device, described further with respect to FIGS. 4A and 4B. It is understood that device 102 is not limited to a cell phone. Device 102 may be a stand-alone device (such as a portable computer, a tablet computer, a radio-enabled digital recorder, a radio), or may be an integral part of a global positioning system (GPS), a hearing aid, a cell phone, a watch, a television remote, a car key fob, a portable game controller or any similar device. Device 102 may be carried by user 116, or may be installed in or on a vehicle such as a car.

For certain applications, device 102 may be fixed and installed at home, or be part of a fixed telephone, a desktop computer, a television set or a game console. Device 102 may include one or more sensors with associated software, described further below with respect to FIG. 3. If device 102 is more like a "smart" phone, system 100 may have access to textual data (including electronic mail, chat transcripts and documents), audio data (including phone conversations, music on the device or streamed to the device and ambient audio picked up by one or more microphones) and user search logs. Some or all of this data may be relevant to determining contextual information.

Device 102 may capture a cumulative acoustic signal 122 representing an audio scene in proximity to device 102. Cumulative acoustic signal 122 may include, for example, speech of user 116 (even when not carrying out a phone call), other sounds made by user 116 (such as coughing), the speech of other talkers 118 in proximity to device 102 and surrounding sounds 120 in proximity to device 102 (such as sirens, airplanes, gunshots, and other environmental sounds). The cumulative acoustic signal 122 may be recorded by device 102 to form at least one audio stream (depending upon the number of transducers of device 102 capable of capturing acoustic information).

Device 102 and/or server 104 may perform contextual-based searching via respective contextual search systems 112, 114 using the audio stream(s). According to an exemplary embodiment, device contextual search system 112 may perform an initial contextual-based search using the audio stream(s). The initial search results from device 102 (and, optionally, the audio stream(s)) may be provided to server 104. Server 104 may perform a further contextual-based search using remote contextual search system 114. In this example, by distributing the search process between device 102 and server 104, a more directed search result may be achieved, with a reduced computational load on device 102 and server 104.

For example, contextual search system 112 (or system 114) may not wait until the end of an event to begin a search. As another example, device contextual search system 112 may perform a number of initial searches throughout the day. At the end of the day, all of the initial search results may be provided to remote contextual search system 114. Remote contextual search system 114 may then use one or more of the initial search results to conduct a search.

According to an exemplary embodiment, device 102 may be used to initiate searches and to provide search results to inform user 116. Audio streams and other information from device 102, along with any analysis results of the audio streams from device 102, may be passed to device contextual search system 112 and/or remote contextual search system 114 to provide context for the search.

Figure 3:
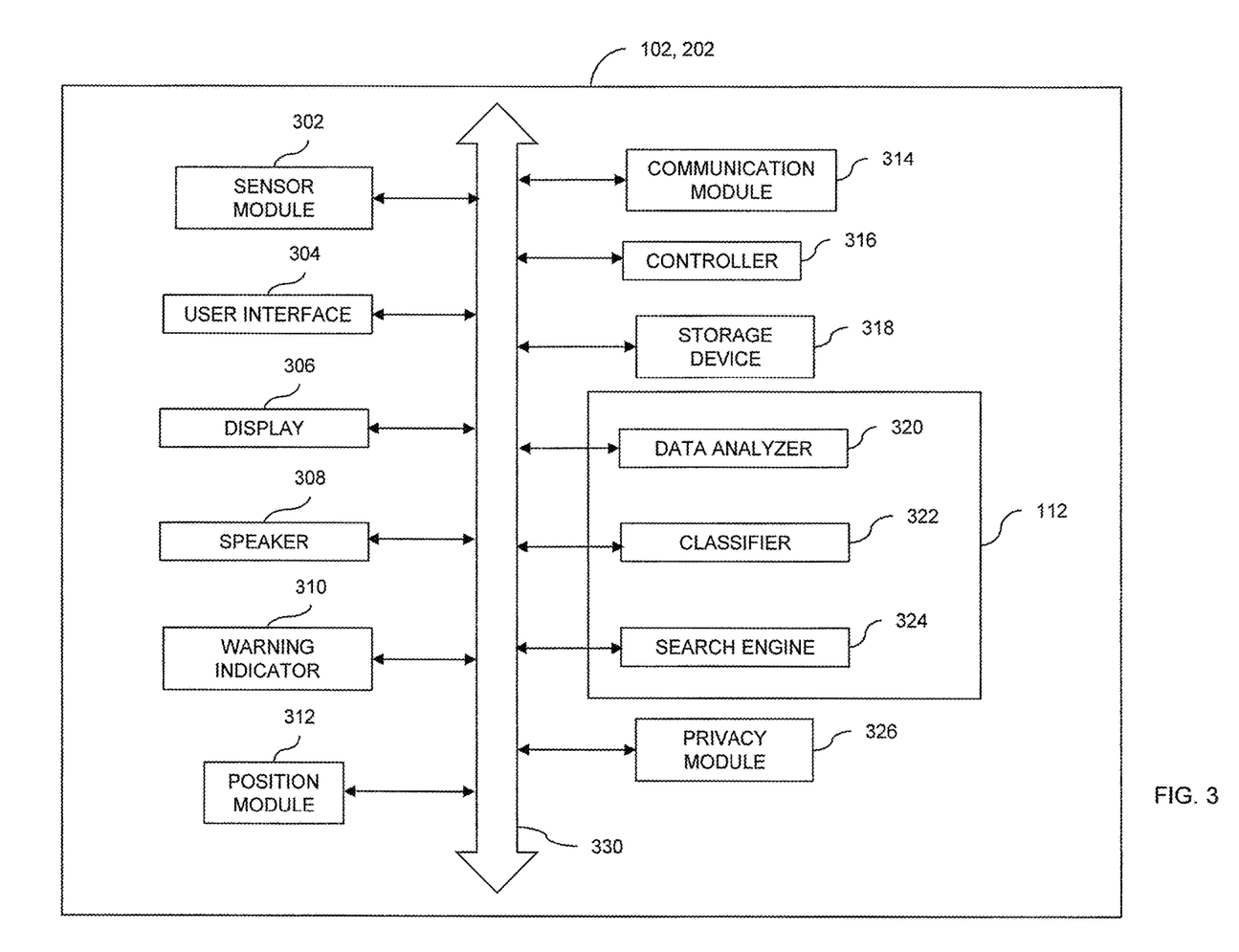
FIG. 3 is a functional block diagram of an exemplary device of the systems shown in FIGS. 1 and 2, according to an embodiment of the present invention.

Remote contextual search system 114 may include data analyzer 124, classifier 126 and search engine 128. Device contextual search system 112 may include components similar to those of remote contextual search system 114 (such as data analyzer 320, classifier 322 and search engine 324, as shown in FIG. 3). Accordingly, the description of remote contextual search system 114 below also pertains to device contextual search system 112.

Data analyzer 124 may be configured to analyze information from device 102. The information may include data previously classified by device contextual search system 112, audio streams provided by device 102, information from other types of sensors included in device 102 (described further below with respect to FIG. 3), a geographical location of device 102 and/or a time of capture of the audio streams. Data analyzer 124 may also pre-process the audio streams and/or other sensor information, for example, to substantially remove or reduce noise.

Data analyzer 124, via classifier 126, may classify the audio stream (as well as other information) to form classified information. The classified information may include, for example, a particular audio stream, key words in the audio stream, speech events, non-speech events and/or topics assigned to sections of the audio stream. Data analyzer 124 may also use classifier 126 to classify other non-audio information (i.e., from other types of sensors such as from biometric sensors, environmental sensors, image sensors) into other classified information. Although a single classifier 126 is shown in FIG. 1, classifier 126 may include a plurality of classifiers, each classifier may be configured to classify a different type of data.

Data analyzer 124 may use classifier 126 to build profiles of audio information (and other classified information from other types of sensors). Classifier 126 may be capable of classifying non-speech sounds and detecting acoustic (non-speech) events, for example, a siren or a gunshot. Classifier 126 may include a speech recognizer to recognize speech, perform key word spotting on speech information, and build voice models of various speakers (such as user 116 and/or talkers 118) within auditory range of device 102, for speaker identification. Data analyzer 124 may use classifier 126, as well as machine learning methods, for example, to identify gender, probable age range, nationality, emotion and other demographic features from the audio stream. Classifier 126 may use collections of words to probabilistically assign a topic to a current discussion.

Data analyzer 124 may determine acoustical contextual information (as well as other contextual information) from among the classified information, for example, in view of at least one search term. The contextual information (acoustic as well as other information) may be provided along with the at least one search term to search engine 128. Search engine 128 may perform a search of the search term using the contextual information, to focus the search according to the intent (context) of user 116. Search engine 128 may perform the search using one or more search providers. Search results obtained from search engine 128 may be provided to device 102. Device 102 may, for example, present the search results on a visual display, aurally or via a haptic interface (such as a vibratory interface).

For example, when a text search is initiated on device 102 (such as a cell phone), words recognized from device 102 (via classifier 126) during a predetermined time leading up to the search request may be appended to the search request via data analyzer 124 as contextual information. In addition, the words may be analyzed via data analyzer 124 to determine whether they are representative of a topic, a location, or other larger classification, and the classification may be passed to search engine 128 for assistance in targeting the search.

A non-exclusive list of context available from device 102 may include, for example, audio recorded in a previous time period; previous words from a recently collected audio stream (for example, from speech recognition or word spotting); a speaker identity for each segment of previously collected audio or text; a topic of a previous discussion, external talk, voice or text; and classified sounds in a previously collected audio stream (e.g., coughs, sneezes, vehicle sounds, machinery sounds and their analysis, environmental sounds such as road noise). These examples of sounds are not an exhaustive list.

According to an exemplary embodiment, If a search query is automatically generated by device 102, contextual search system 112 (and/or system 114) may also use information which came after the decision to create the search query. Device 102 may contain a circular buffer of audio, words, speaker identities, and other information. Non-time sensitive queries may use any of this information as the context of the search query. For example, system 100 may keep the previous two minutes of speech and text and the following two minutes of speech and text relative to initiation of a search query. System 100, looking for a verbal trigger for a search, may find the trigger within the circular buffer (or a storage medium), and may delay the search for up to a size of the buffer, to send context from both before the search and from after the search trigger.

The number of available audio streams may depend on the type of device 102 as well as the number of transducers available on device 102. For example, if device 102 includes an earpiece and a cell phone (such as earpiece 402 and external device 404 shown in FIG. 4A), the audio streams may include internal audio (such as from internal microphone 406) from the earpiece, external audio (such as from external microphone 410) from the earpiece, electrical signals or audio available either at the earpiece (such as provided to receiver 408) or at the associated cell phone, audio from a microphone on the cell phone, or external audio from the earpiece as modified by a processing system (such as processor 412) of the earpiece.

Each audio stream may be classified or acted upon by classifier 126 (such as a speech recognizer or an event classifier) independently, or may be combined using signal processing (beamforming, for example) to highlight particular sources of audio. The information from the various audio streams may be selectively provided to search engine 128 via data analyzer 124. For example, words from audio signals provided by internal microphone 406 (FIG. 4A), which may have clean audio and may be accurately transcribed, may be combined with the topic derived from external microphone 410, and both may be provided to search engine 128. Many possible combinations of information from system 100 may be provided to assist the search.

Searches may be initiated by a user interface on device 102 (such as user interface 304 shown in FIG. 3) or by voice activation (such as via sensor module 302 shown in FIG. 3). For example, the user interface may include at least one of a keypad, an eye-tracker or other tactile interfaces (for example, a sip and puff device). Contextual search system 112 (and/or system 114), however, in order to take full advantage of the information provided by device 102, may expand its capability to search words informed by audio, words informed by other background words, audio informed by words, audio informed by one or more audio streams, or other mixtures of search initiation and contextual information.

The audio streams and classified data from device 102 may be selectively queried by a search organization (such as device contextual search system 112, remote contextual search system 114 or another organization) after a search. For example, the search organization may request all the words from an audio stream for the two minutes following the delivery of a search result. Such words may be used to assess the success of the search, or to provide follow-up search results, or other analyses which may be of use to either the search organization or user 116.

It is also possible that a search provider may want not only following information but preceding information from a search. The search provider may query system 100 for words or audio preceding the search for a predetermined amount of time, as well as words and audio which follow the search. This information may be used to refine the search process, to analyze the results of the process, or to offer one or more secondary search results which take advantage of the information collected both before and after a user-initiated search.

Data from device 102 may be recorded either locally on device 102 or at remote location. The data may be continuously recorded, or may be selectively recorded responsive to a request by user 116, a geographic location, a request by a search provider or other service provider, the time of day, the status of device 102, or any other signal.

The recordings may be cached in device 102, or they may be transmitted to remote storage 110 for storing. Recordings of events may be made searchable, by contextual search system 112 (and/or system 114). For example, one or more of the audio streams may be transcribed, noting events in the audio stream(s) which are sensed by classifier 126. Topics or other identifiers may be periodically assigned to the recordings based on statistical or other analyses of the data, via data analyzer 128. The cached data can include geographic information, images or videos taken by device 102, biologically sensed information from device 102, or any other recorded or sensed available data.

Remote storage 110 may store at least one of audio streams (from device 102), other information from device 102 (such as from other sensors, time, and/or geographic location), classified audio information, other (i.e., non-acoustic) classified information, acoustical context information, other (i.e., non-acoustic) contextual information, search terms or search results (from device contextual search system 112 and/or remote contextual search system 114). Remote storage 110 may include, for example, a random access memory (RAM), a magnetic disk, an optical disk, flash memory or a hard drive.

A suitable data analyzer 124, classifier 126 and search engine 128 may be understood by the skilled person from the description herein.

Figure 2:
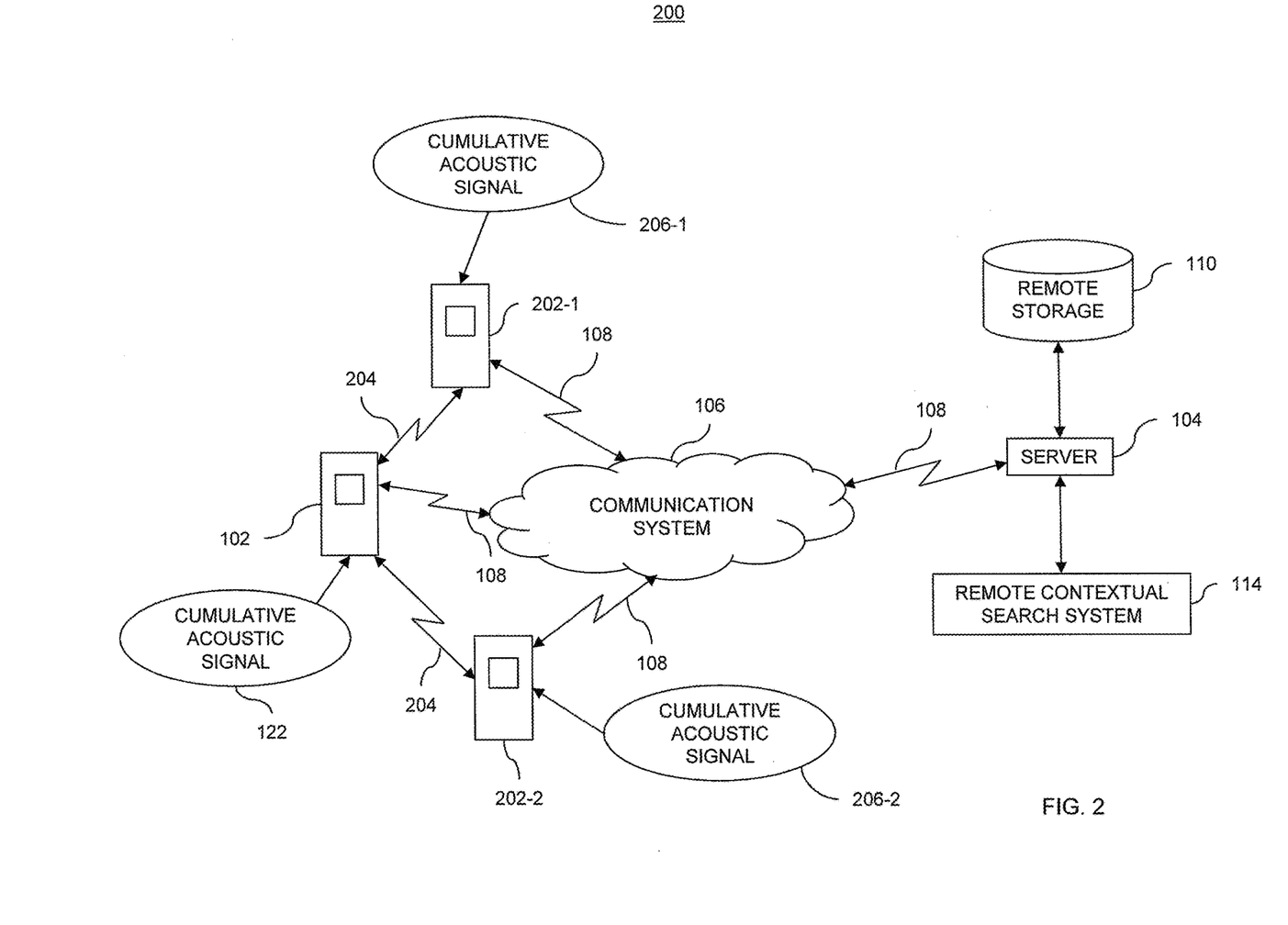
FIG. 2 is a functional block diagram of an exemplary ad-hoc network system for contextual-based searching, according to an embodiment of the present invention.

Referring to FIG. 2, a functional block diagram of an exemplary ad-hoc network system for contextual-based searching, designated generally as system 200, is shown. System 200 is similar to system 100 (FIG. 1) except that system 200 may include a plurality of devices, including device 102 (also referred to as controller 102), device 202-1 and device 202-2. Devices 202-1, 202-2 may also capture respective cumulative acoustic signals 206-1, 206-2, which may be different from cumulative acoustic signal 122 of device 102.

Devices 202 and device 102 may be capable of direct communication with each other, via communication link 204. Devices 120 and device 102 may also be capable of communication with communication system 106, via communication link 108. Devices 206 and device 102 may be similar types of devices or may be different types of devices. Different kinds of devices 202, 102 may include different sensors and/or different software. In general, devices 206 may include any of the devices described above with respect to device 102.

In system 200, one or more of devices 202 and device 102 may be configured to acquire audio information (as well as other information) in proximity to respective devices 202 and 102. Device 102 may be the same as device 202, except that device 102 may be configured to act as a controller for selectively acquiring sensor information from among devices 202 and for determining contextual information. Although one device 102 is illustrated as being a controller, it is understood that multiple devices 102, 202 may act as controllers.

Although device 102 is illustrated as a controller for gathering sensor information, it is understood that communication system 106 and/or server 104 may also be configured to act as a controller.

In FIG. 2, a small number of representative devices 102, 202 are illustrated. Devices 102, 202 may be part of a large population of devices (e.g., a large fraction of the telephones in a metropolitan area) and system 200 may adaptively enable particular subsets of the devices 102, 202 and/or selectively configure enabled devices 102, 202. For instance, device 102 (or server 104) may enable and/or configure the devices 202 according to triggering events detected at one or more devices 102, 202.

Referring to FIG. 3, a functional block diagram of exemplary device 102 (or device 202) is shown. Device 102 (or device 202) may include one or more of sensor module 302, user interface 304, display 306, speaker (i.e., a loudspeaker) 308, warning indicator 310, position module 312, communication module 314, controller 316, storage device 318, device contextual search system 114 and privacy module 336, which may be coupled together via data and control bus 330.

For simplicity, the description below is with respect to device 102. It is understood that device 202 may include one or more the same components as device 102. Accordingly the description of device 102 is also pertinent to device 202. Thus no further description of device 202 may be given.

A typical device 102 may include communication module 314, which provides communication link 108 (FIG. 2) through communication system 106 to sever 104 and/or communication link 204 (FIG. 2) to other devices 202. Communication module 314 may also serve a role in acquiring positioning signals (e.g., GPS signals, Wi-Fi signal strengths, etc.), and may also provide a way to communicate directly with other devices 202.

Device 102 a may include sensor module 302 for the acquisition of sensor information. Sensor module 302 may include one or more microphones for collecting cumulative acoustic signal 122 (FIG. 1). Sensor module 302 may also include one or more environmental sensors (such as a temperature sensor, a motion sensor such as an accelerometer) for collecting environmental information associated with device 102. Sensor module 302 may also include one or more biometric sensors (such as heart rate) for sensing biometric information regarding a user of device 102. Sensor module 302 may also include a camera (i.e., an image sensor) for capturing still images and/or video of the surrounding environment of device 102. Sensor module 302 may also include a compass for providing positioning information.

In general, sensor module 302 may include any sensor capable of measuring a physical quantity and converting it into a signal that may be used by system 100 (FIG. 1) (or system 200 shown in FIG. 2). For example, sensors in sensor module 302 may also include, without limitation, one or more of light detection sensors, proximity sensors, gravity detection sensors, a magnetic field detection sensors, electrical field detection sensors, vibration sensors, pressure sensors, humidity sensors, moisture sensors, toxin detection sensors, nutrient detection sensors or pheromone detection sensors.

In an exemplary embodiment, sensor module 302 of device 102 may have one or more transducers to capture near field and far field acoustic signals. For example, device 102 may include a mobile device (for example, a cell phone) or a computer (including a laptop, a tablet or a desktop computer). The transducer may include any transducer capable of converting a signal from the user into an audio signal. For example, the transducer may include an electro-mechanical, optical or a piezoelectric transducer. The transducer may also include a throat microphone, a jaw microphone or a bone conduction microphone. The transducer may be capable of detecting vibrations from the face of the user and convert the vibrations to an audio signal.

The one or more transducers may be used to detect and/or differentiate speech from a user associated with device 102 from the external (far field) sound field. For example, a boom microphone may be used to localize a user's speech from the external sound field. As another example, a plurality of microphones may be combined, such as by beamforming, to localize the user's voice from the external sound field. As another example, one or more transducers on a mobile device 102 that are proximate to a speech pickup location may be used as near field transducers, while additional transducers on an opposite side of the device may be used as far field transducers. As another example, a combination of transducers on different devices may be used to detect and distinguish the user's speech (near field signal) and transducers on other devices (such as adjacent cell phones). As a further example, device 202 in a vicinity of device 102 may be used to collect the external sound field.

User interface 304 may include any suitable user interface capable of providing a search request and a search term. User interface 304 may also be capable of providing parameters for one or more of device contextual search system 112, sensor module 302, display 306, speaker 308, warning indicator 310, position module 312, communication module 314, storage device 318, and privacy module 326. User interface 304 may include, for example, a pointing device, a keyboard and/or a display device (including a touch-sensitive display).

Device 102 may include display 306, speaker 308 and/or warning indicator 310 for presenting information to user 116 of device 102. Display 306 may include any suitable display device capable of presenting information on device 102. Warning indicator 310 may include any suitable visual indicator for presenting a warning on device 102. The warning may include, for example, an indication that audio information is being recorded. It is understood that speaker 308 may also audibly present a warning indication. Although user interface 304 and display 306 are illustrated as separate devices, it is understood that the functions of user interface 304 and display 306 may be combined into one device.

Device 102 may include position module 312, to maintain a position estimate for device 102. For example, position module 312 may use positioning system 180 (FIG. 1) to obtain the position estimate.

Storage device 316 may store at least one of raw sensor information (from sensor module 302), classified information (acoustic and/or non-acoustic) (from device contextual search system 112 and/or system 114 shown in FIG. 1), contextual information (acoustic and/or non-acoustic) (from device contextual search system 112 and/or system 114), search results (from device contextual search system 112 and/or system 114 shown in FIG. 1), location information (from position module 312) or a time stamp associated with the stored information (such as from a system clock (not shown). Storage device 318 may include, for example, a RAM, a magnetic disk, an optical disk, flash memory or a hard drive.

Controller 316 may be coupled, for example, via data and control bus 330 to one or more of sensor module 302, user interface 304, display 306, speaker 308, warning indicator 310, position module 312, communication module 314, controller 316, storage device 318, device contextual search system 114 and privacy module 336. Controller 316 may be configured to control acquisition of sensor information, analysis of the sensor information for context, transmission and/or receipt of sensor information, transmission and/or receipt of contextual information and or search results, as well as any presentation of information by device 102 (such as via display 306, speaker 308 and/or warning indicator 310). Controller 316 may include, for example, a logic circuit, a digital signal processor, a microprocessor or a multicore processor to facilitate the parallel processing of multiple data streams. It is understood that one or more functions of device contextual search system 112 may be performed by controller 316.

Device contextual search system 112 includes data analyzer 320, classifier 322 and search engine 324. As discussed above device contextual search system 112 is the same as remote contextual search system 114 except that system 112 may be included as part of device 102. System 112 may be configured to analyze information (acoustic and/or non-acoustic), determine contextual information (acoustic and/or non-acoustic) and/or perform a search, based on information collected locally by sensor module 302 for device 102. System 112 may also receive/analyze information from other devices 202, via communication module 314.

Privacy module 326 may include mechanisms to implement privacy and/or security requirements and policies for applications relating to the acquisition and use of information of various kinds, including audio information, by one or more devices associated with a number of carriers. These policies and mechanisms may control the use of devices 102 including the ability to remotely switch on and switch off sensing (e.g., listening), the ownership of any audio information garnered by these devices 102, the user's ability to easily control sensing and information acquisition, mechanisms to opt-in and opt-out of applications, carrier-wide or network-wide data gathering, the protection of any audio personally identifiable information (PII) that is gathered, and any aggregated data that is created from a number of devices 102, 202 and networks. Policies or standard practices may also be established for private or semi-private situations where not all users present have opted-in for data acquisition.

Recorded data may be encrypted so that is available only by permission of the owner. Encryption processes are well known, and an appropriate encryption may be provided by the earpiece device, by the cell phone, or after-the-fact by processes of the remote storage location. Cell phone communications are often encrypted, so additional encryption may not be needed before remote storage.

Figure 4A:
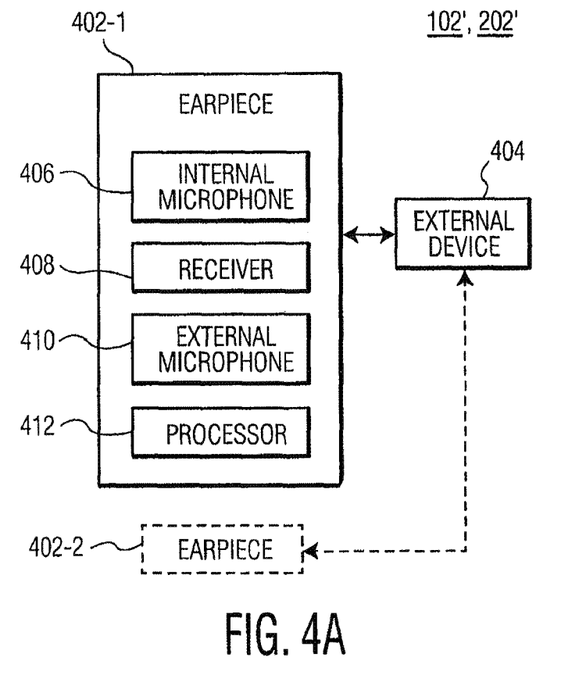
FIG. 4A is a functional block diagram of an exemplary device of the systems shown in FIGS. 1 and 2, according to another embodiment of the present invention.
Figure 4B:
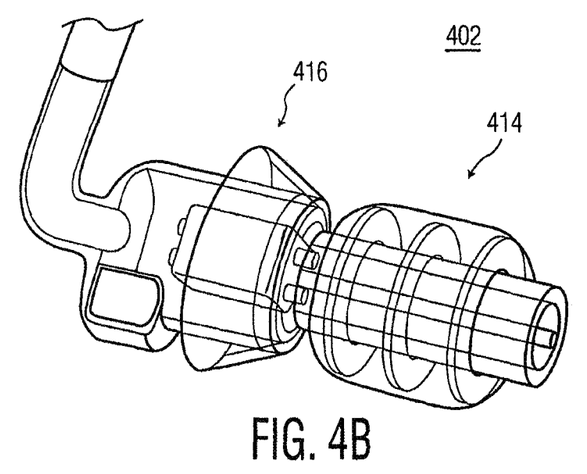
FIG. 4B is a perspective view diagram of an exemplary earpiece of the device shown in FIG. 4A, according to an embodiment of the present invention.

Referring to FIGS. 4A and 4B, an exemplary device 102' (and/or device 202') is shown, according to another embodiment of the present invention. Device 102' (202') is similar to device 102 (202) shown in FIG. 3, except that device 102' (202') includes at least one earpiece 402 and external device 404. According to one embodiment, device 102' (202') may include a single earpiece 402-1 for one ear. According to another embodiment, device 102' (202') may include two earpieces 402-1 and 402-2, one for each ear.

Devices 102', 202' may include one or more of the same components of device 102 (202) shown in FIG. 2. For example, external device 404 may include at least one of the components of devices 102, 202 shown in FIG. 2. In addition, earpiece 402 may include transducers (such as internal microphone 406 and/or external microphone 410) for collecting one or more audio streams. Processing may be performed by a processor within external device 404 and/or processor 412 in earpiece 402. In an exemplary embodiment, processing may be divided between processor 412 and a processor within external device 404.

Earpiece 402 may include one or more internal microphones 406, which may be located in the ear canal but may be blocked from an external audio field (i.e., a far field signal in proximity to the earpiece) by an occlusion element 414 (FIG. 4B) (for example, an expandable balloon or another technique) as to obtain an obstruction (occlusion) in the ear canal. Earpiece 402 may also include at least one receiver 408 (i.e., an internal loudspeaker) which may be configured to provide audio from the external sound field or from external device 404 (for example, a radio, a cell phone, etc.).

Earpiece 402 may include one or more external microphones 410, for sampling the external sound field. Microphone(s) 410 may be located in earpiece 402. Earpiece 402 may also be coupled to one or more other external microphones, for example, one or more microphones in a headset or a cell phone.

A computer or other processor(s) 412 may be included in earpiece 402 to provide, for example, digitization of the audio signals, communication with external device 404, and local storage for use in managing the sound environment of user 116 (FIG. 1), and for information transfer with external device 404. Processor 412 may perform analysis of audio signals received from external microphone(s) 410 and/or the at least one internal microphone 406, for example to detect acoustic events (e.g., words, spoken topics, music or environmental sounds). Processor 412 may also perform any suitable processing on the audio signals (such as feature extraction) and transmit acoustic information. Processor 412 may include, for example, a logic circuit, a digital signal processor or a microprocessor.

As shown in FIG. 4B, earpiece 402, in general, includes occlusion element 414 and component housing 416. Occlusion element 414 may be configured to substantially isolate the ear canal from the external audio field. Component housing 416 may hold electronic components (such as internal microphone 406, receiver 408, external microphone 410 and processor 412) of earpiece 402.

Figure 5:
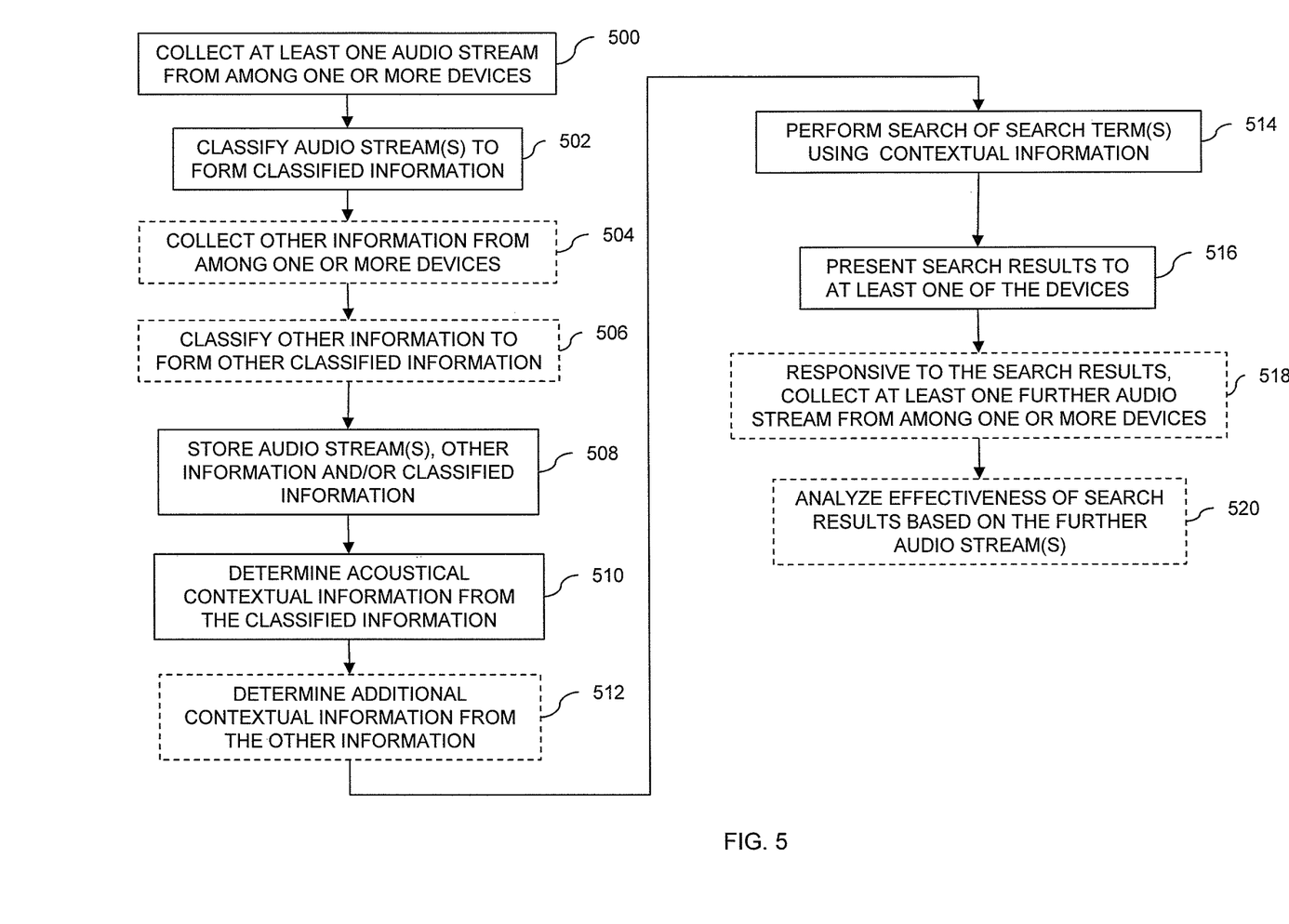
FIG. 5 is a flowchart diagram of an exemplary method for searching which uses acoustical context, according to an embodiment of the present invention.

Referring to FIG. 5, a flowchart diagram of an exemplary method for searching using acoustical context is shown. The steps illustrated in FIG. 5 represent an example embodiment of the present invention. It is understood that certain steps may be performed in an order different from what is shown. It is also understood that certain steps may be eliminated.

At step 500, at least one audio stream is collected from among one or more devices. For example, at least one audio stream may be collected from device 102 via sensor module 302 (FIG. 3). According to another example, audio streams may be collected from device 102, as well as devices 206-1 and 206-2 (FIG. 2). At step 502, the audio stream(s) are classified to form acoustic classified information, for example, by classifier 126 (FIG. 1) and/or classifier 322 (FIG. 3).

At optional step 504, other (non-acoustic) information may be collected from among one or more devices, for example by sensor module 302 (FIG. 3). At optional step 506, the non-acoustic information may be classified to form other (non-acoustic) classified information, for example, by classifier 126 (FIG. 1) and/or classifier 322 (FIG. 3).

At step 508, at least one of the audio stream(s), the other information, the classified (acoustic) information or the classified other (non-acoustic) information is stored, for example, at remote storage 110 (FIG. 1) or storage device 318 (FIG. 3).

At step 510, acoustical contextual information is determined from the classified (acoustic) information, for example, by data analyzer 124 (FIG. 1) or data analyzer 320 (FIG. 3). At optional step 512, additional (non-acoustic) contextual information is determined from the other (non-acoustic) information and/or the other classified (non-acoustic) information, for example, by data analyzer 124 (FIG. 1) and/or data analyzer 320 (FIG. 3).

At step 514, a search of at least one search term is performed using the contextual information determined at step 510 (and, optionally at step 512), for example, by search engine 128 and/or search engine 324. At step 516, the search results may be presented on at least one of devices 102, 202 (FIG. 2), for example, by user interface 304 (FIG. 3), display 306 and/or speaker 308.

At optional step 518, responsive to the search results (at steps 514 and 516), at least one further audio stream may be collected from among one or more devices 102, 202 (FIG. 2), for example, by controller 316 (FIG. 3) selectively activating sensor module 302. At optional step 520, an effectiveness of the search results may be analyzed based on the further at least one audio stream, for example, by device contextual search system 112 (FIG. 1), remote contextual search system 114, a search organization and/or a search provider.

Steps 500-520 may be repeated for additional search requests provided via user interface 304 (FIG. 3) (i.e., a search request trigger). According to another embodiment, audio streams (and other non-acoustic information) may be continuously monitored. Responsive to a detection of a predetermined key word, topic or event which may be of interest, a search may be automatically generated by system 100 (FIG. 1) (or system 200 (FIG. 2)). Examples of continuous monitoring are provided further below.

It should be understood that the description herein focuses on "smart" phones as an example, and other types of fixed or mobile devices may be used in conjunction with or instead of "smart" phones. Also, the description herein focuses on aggregation or combination of audio information as an example, but aggregation and processing of other forms of information, including video and biometric information may be performed in conjunction with or instead of the audio data examples described below.

The invention will next be illustrated by reference to several examples. The examples are included to more clearly demonstrate the overall nature of the invention. These examples are exemplary, not restrictive of the invention.

EXAMPLE APPLICATIONS

Referring to FIGS. 4A and 4B, in an exemplary application, earpiece 402 and external device 404 may be networked with other devices (such as in system 200 shown in FIG. 2) to provide information to the network. For instance, a fire department squad may have networked devices which continuously collect clean audio from internal microphones 406, ambient audio from external microphones 410, and geographic, temperature, acceleration and other information from sensors in either earpiece 402 or external device 404. The system 200 could provide continuous communications between members of the team, alerts about dangerous conditions based on external audio and sensor information, and access to context-sensitive search for information about conditions, locations, protocols, equipment availability, police action, or other such information as may be useful to the team. The data may all be recorded in a remote storage 110 (FIG. 2), and may be available for a post-hoc analysis of the situation and the actions of the team. In addition, the complete recorded information thus far, as well as real-time audio and sensor information, may be made available to a supervisory site for monitoring the situation and for command/control purposes. This data may be used to continuously update a status display so that, for example, a temperature map of all areas visited by equipped personnel may be maintained.

The remote data may become information for forensic analysis, as it may contain a record of information spoken in the environment of the user, data spoken by the user, metadata, and search results. It may, in one instantiation, also contain the identity of each speaker in the record, or at least the identification of several different samples of audio as coming from the same speaker. Likewise, a corporation can use these records to confirm verbal contract discussions and for other legal and business relations.

An external search process may continuously monitor the conversations and data from the firefighting team, and may offer search results about relevant information such as weather, status of nearby firefighting resources, traffic, communications status, or other information, which could aid the responders. Context may be continuously tracked, and may assist the search engines in providing targeted, relevant search information to the firefighters. Similar scenarios may be considered for social situations, for military activities or for many other collective activities.

Referring to FIG. 2, according to another exemplary application, devices 102, 202 may include cell phones which may be in different vehicles. Various sensors of devices 102, 202 may record various indications of traffic congestion and/or traffic accidents. For example, accelerometers in devices 102, 202 may indicate a sudden stop; audio recorded by devices 102, 202 may indicate a change in emotional state, key words from the audio may indicate traffic congestion or an accident; or the recorded audio may indicate sudden very high sound pressure levels for one or more sounds. Given any of these indications, system 200 may provide traffic or accident conditions to devices 102, 202, or new routing instructions for avoiding the traffic or accident. If a possible accident is indicated, system 200 may turn on a speaker phone of device 102 (or device 202) and may call emergency personnel, so that the emergency personnel may communicate with one or more vehicle occupant(s). System 200 may also turn on a video camera of device 102 (or device 202) to visually monitor activity in the vehicle. System 200 may also turn on a thermometer on device 102 (or device 202), in order to detect any increase in heat (which my indicate a fire) and send the results to the emergency personnel (such as emergency medical service and/or a fire department).

According to another exemplary application, in a business scenario, an exemplary device 102 (FIG. 1) (or device 102' as shown in FIG. 4A) may be on during the entirety of the business day. Audio, words, and sensed events may be used for context-sensitive searches during the day, and a process running on the external device (or on the earpiece device) may generate occasional searches spontaneously based on the context observed in the transcripts or keyword streams from the audio and or other keystroke events. For instance, if the business person is engaged in finding a new building for his business, device 102 (FIG. 1) (or device 102' shown in FIG. 4A) may sense that there is a real estate transaction being discussed, and could spontaneously generate searches about the real estate environment in the particular geographic location, about legal difficulties associated with the locations being examined, about pending regulations associated with those locations, about tax structures or special accounting situations dealing with those structures, about transportation and communications availability at the locations, etc. These spontaneously generated searches could be noted in text messages to the user, could be provided on the display of device 102 (FIG. 1), aurally to earpiece 402 (FIG. 4A) or might simply be provided in the historical recording of the day.

After the day is finished, an application could provide the user with a summary of the day's activities, and could provide all of the associated search information generated during the day. This search information could be organized by relevance, and the process could re-organize the information to best serve the interests of the business person. The search engine itself could collect prior search results and could re-organize and prioritize the information previously generated to deliver targeted information after-the-fact to the customer, along with information which would be of commercial interest to both the customer and the search organization, such as advertising, recommendations about real-estate information sources, pending legislation, or other relevant information. Search results from the current day and the past week or month can be available to the user for analysis and presentation, and data resulting from this analysis can be provided to a search engine as context for future search.

The user could review the day's activities, and could generate additional search queries based not only on the local audio streams at the moment, but also on the data from the record which is being reviewed. The context provided to the search engine could be both retrospective and prospective to the particular event being reviewed, as the recordings could be expected to extend both before and after the reviewed event.

During a review, system 100 (FIG. 1) can cluster audio information by speaker. If any single audio sample is identified by speaker, then that identity can be appended to all of the audio for that speaker. If the identity of the speaker is unknown, the reviewer may be asked to identify the speaker, and from that time forward (and even in the retrospective data) the speaker can be tagged in the recorded data. As noted below, the speaker identity may be almost certainly be ascertained if the speaker is involved in an ad-hoc network, and is engaged in conversation with the user while the network is active.

In any networked situation, such as for system 200 (FIG. 2), a given speaker's audio might appear both in the external microphone signal from some members of the network, as well as from the internal microphone of one of the network participants. In this case, the processing available to the network may assign an identity to that audio information. When generating the context for a search, this means that not only the words from the external audio are available to the search, but each set of words is associated with the identity of the speaker of those words, and the context of the search can be further refined by understanding the history of the particular person uttering the words. For instance, if the speaker identified is in a wheel chair, then the search generated by an assistant to the person can be informed about the physical constraints of the person being helped, and can be more targeted to helpful results.

In a networked situation, the identities of the participants in the network can provide information to search engine 128 (FIG. 1) or search engine 324 (FIG. 3). For instance, at a gathering of a collection of people who like bluegrass music, the identities of the people involved in an ad-hoc network might suggest interest in a particular group, event, or musical recording process that will inform the search engine. Classifiers 126 (FIG. 1) or classifiers 324 (FIG. 3) for talkers which appear often can be embedded in the device 102 (or device 102' shown in FIG. 4A), thus providing identity on-the-fly for frequently encountered discussants.

Although the invention has been described in terms of systems and methods for searching using acoustical context, it is contemplated that one or more steps and/or components may be implemented in software for use with microprocessors/general purpose computers (not shown). In this embodiment, one or more of the functions of the various components and/or steps described above may be implemented in software that controls a computer. The software may be embodied in non-transitory tangible computer readable media (such as, by way of non-limiting example, a magnetic disk, optical disk, flash memory, hard drive, etc.) for execution by the computer.

For example, some of the software may include instructions for execution at the device 102 and devices 202. This software may be stored on a non-transitory tangible computer readable medium at a central location, for example, at server 104 for distribution to the devices 102, 1202, may be transferred over a digital communication medium, and/or stored in a machine readable medium at the devices 102, 202 (e.g., as downloaded applications/applets). Some of the software may be hosted at server 104 (e.g., in a distributed "cloud" of processors) and made accessible by storing it on non-transitory tangible computer-readable media for execution on processors of server 104.

Although the invention is illustrated and described herein with reference to specific embodiments, the invention is not intended to be limited to the details shown. Rather, various modifications may be made in the details within the scope and range of equivalents of the claims and without departing from the invention.

We claim:
1. A system, comprising:
a display;
a microphone configured to sample an external sound field and generate an audio signal;
a location sensor;
a memory configured to store instructions; and
a processor, wherein the processor is operatively connected to the memory, the microphone, the location sensor, and the display, wherein the processor executes the instructions to perform operations, the operations comprising:
receiving a first portion of the audio signal during a predetermined time leading up to receiving a search term;
receiving a second portion of the audio signal comprising the search term from a user;
determining, from the first and second portions of the audio signal, acoustic contextual information;
receiving a location of the system via the location sensor;
determining, from the location, non-acoustic contextual information;
generating one or more words from the acoustic contextual information derived from the user and from the non-acoustic contextual information;
generating a search request including the search term and the one or more words appended to the search term to expand or narrow the search request;
and
presenting search information, with targeted information obtained based on the search request, to the display.

2. The system of claim 1, wherein the operations further comprise:
storing the search information on a remote storage device.

3. The system of claim 1, wherein the search term is based on a text search received via the user on the display.

4. The system of claim 1, wherein the search term is a keyword uttered by the user.

5. The system of claim 1, wherein the operations further comprise:
sending a message, based on the search information, to emergency personnel.

6. The system of claim 1, wherein the operations further comprise:
receiving a second audio signal from a second microphone.

7. The system of claim 6, wherein the second microphone is in an earpiece wirelessly connected to the processor.

8. The system of claim 6, wherein the second microphone and the microphone are used to localize a voice embedded in the audio signal and the second audio signal.

9. The system according to claim 6 wherein the second microphone measures an acoustic ambient environment.

10. The system according to claim 1 wherein the microphone is an external microphone within an earpiece that includes an internal microphone.

11. The system of claim 1, wherein the acoustic contextual information is determined from speech events and non-speech events classified in the audio signal.

12. The system of claim 1, wherein the acoustic contextual information is determined from a speaker identification classified in the audio signal.

13. The system of claim 1, wherein the non-acoustic contextual information is further determined from at least one of a time of day or an environmental condition.

14. The system of claim 1, wherein the non-acoustic contextual information is further determined from non-audio information classified from at least one of a biometric sensor, an environmental sensor, or an image sensor.

15. The system of claim 1, wherein the search term is received based on detection of a search request trigger comprising a predetermined key word.

16. The system of claim 1, wherein the operations further comprises:
 displaying a summary of daily activities based on search results including the search information.

17. The system of claim 1, wherein the operations further comprises:
 activating, in response to a search result based on the search request, a sensor module to receive at least one further audio signal.

18. A method, comprising:
 receiving a first portion of an audio signal from a microphone of a device, the first portion received during a predetermined time leading up to receiving a search term;
 receiving a second portion of the audio signal comprising the search term from a user;
 determining, from the first and second portions of the audio signal, acoustic contextual information;
 receiving a location of the device via a location sensor of the device;
 determining, from the location, non-acoustic contextual information;
 generating one or more words from the acoustic contextual information derived from the user and from the non-acoustic contextual information;
 generating a search request including the search term and one or more words appended to the search term to expand or narrow the search request;
 and
 presenting search information, with targeted information obtained based on the search request, to a display of the device.

19. The method of claim 18, wherein the method further comprises:
 storing the search information on a remote storage device.

20. The method of claim 18, wherein the method further comprises:
 sending a message, based on the search information, to emergency personnel.

* * * * *

UNITED STATES PATENT AND TRADEMARK OFFICE
CERTIFICATE OF CORRECTION

| | | |
|---|---|---|
| PATENT NO. | : 12,174,901 B2 | Page 1 of 1 |
| APPLICATION NO. | : 16/563537 | |
| DATED | : December 24, 2024 | |
| INVENTOR(S) | : Goldstein et al. | |

It is certified that error appears in the above-identified patent and that said Letters Patent is hereby corrected as shown below:

On the Title Page

Item (73) Assignee, Please change "Apple Inc." to --The Diablo Canyon Collective LLC--.

Signed and Sealed this
Fourth Day of November, 2025

John A. Squires
*Director of the United States Patent and Trademark Office*